(12) United States Patent
Van Splunter et al.

(10) Patent No.: US 8,654,838 B2
(45) Date of Patent: Feb. 18, 2014

(54) SYSTEM AND METHOD FOR VIDEO AND GRAPHIC COMPRESSION USING MULTIPLE DIFFERENT COMPRESSION TECHNIQUES AND COMPRESSION ERROR FEEDBACK

(75) Inventors: Marinus Van Splunter, Helmond (NL); Timo Van Roermund, Eindhoven (NL)

(73) Assignee: NXP B.V., Eindhoven (NL)

( * ) Notice: Subject to any disclaimer, the term of this patent is extended or adjusted under 35 U.S.C. 154(b) by 1046 days.

(21) Appl. No.: 12/551,226

(22) Filed: Aug. 31, 2009

(65) Prior Publication Data
US 2011/0051805 A1 Mar. 3, 2011

(51) Int. Cl.
*G01R 31/08* (2006.01)
(52) U.S. Cl.
USPC ........................... 375/240.03; 375/240
(58) Field of Classification Search
USPC ............................................ 375/240–240.19
See application file for complete search history.

(56) References Cited

U.S. PATENT DOCUMENTS

| | | | |
|---|---|---|---|
| 4,791,483 A | 12/1988 | Miller | |
| 4,893,184 A | 1/1990 | Mattausch et al. | |
| 5,764,286 A | 6/1998 | Kawamura et al. | |
| 7,301,999 B2 | 11/2007 | Filippini et al. | |
| 7,404,109 B2 * | 7/2008 | Hildebrant et al. | 714/700 |
| 7,506,131 B2 | 3/2009 | Chauvel | |
| 7,529,299 B2 | 5/2009 | Poutet et al. | |
| 7,623,270 B2 | 11/2009 | Gardella et al. | |
| 7,777,651 B2 * | 8/2010 | Fallon et al. | 341/51 |
| 8,054,879 B2 * | 11/2011 | Fallon et al. | 375/240 |
| 8,063,801 B2 * | 11/2011 | Korodi et al. | 341/107 |
| 8,073,047 B2 * | 12/2011 | Fallon et al. | 375/240 |
| 8,229,235 B2 * | 7/2012 | Kim et al. | 382/239 |
| 2007/0109156 A1 * | 5/2007 | Fallon | 341/50 |
| 2008/0028281 A1 * | 1/2008 | Miyazaki et al. | 714/776 |
| 2008/0198920 A1 * | 8/2008 | Yang et al. | 375/240.01 |
| 2009/0097555 A1 * | 4/2009 | Baillavoine et al. | 375/240.12 |
| 2009/0296802 A1 * | 12/2009 | Ermolayev et al. | 375/233 |
| 2011/0037626 A1 * | 2/2011 | Fallon | 341/87 |
| 2011/0051802 A1 * | 3/2011 | Van De Waerdt | 375/240.03 |
| 2011/0285559 A1 * | 11/2011 | Fallon | 341/87 |

OTHER PUBLICATIONS

A.K. Riemens, R.J. Van Der Vleuten, P. Van Der Wolf, G. Jacob, J.W. Van De Waerdt, J.G. Janssen; "Transparent Embedded Compression in Systems-on-Chip"; IEEE Workshop on Signal Processing Systems Design and Implementation; 2006; p. 277-282.

Tae Young Lee, et al.; "A Low-Complexity Frame Memory Compression Algorithm and Implementation for MPEG-2 Video Decoder"; AP-ASIC 2000.

Marcelo J. Weingberger, et al.; "The LOCO-I Lossless Image Compression Algorithm: Principles and Standardization into JPEG-LS"; IEEE Transactions on Image Processing, vol. 9, No. 8; Aug. 2000.

* cited by examiner

*Primary Examiner* — Ayaz Sheikh
*Assistant Examiner* — Mounir Moutaouakil (57) ABSTRACT

A line-based one-dimensional system and method for video and graphic compression compresses an image data block that contains image data values from one or more neighboring pixels. The system and method involves compressing an image data sample of the image data block using multiple different compression techniques to generate multiple compression results, selecting one of the compression results, and compressing a next image data sample using the multiple different compression techniques and a compression error from the selected one of the compression results.

20 Claims, 10 Drawing Sheets

SYSTEM AND METHOD FOR VIDEO AND GRAPHIC COMPRESSION USING MULTIPLE DIFFERENT COMPRESSION TECHNIQUES AND COMPRESSION ERROR FEEDBACK

Embodiments of the invention relate generally to video and graphic coding systems and methods and, more particularly, to a system and method for video and graphic compression.

In a video and graphic system, video and graphic data may be compressed before being stored in off-chip memory to reduce the off-chip memory footprint and/or bandwidth towards the off-chip memory. However, a traditional video and graphic compression system has multiple shortcomings. Firstly, a traditional video and graphic compression system may not guarantee a compression ratio over small amounts of video or graphic data. Secondly, a traditional video and graphic compression system generally employs multi-pass compression algorithms and therefore is complex to implement. Thirdly, a traditional video and graphic compression system typically applies compression to line segments and uses fixed quantization per segment, which sometimes results in border artifacts. Thus, there is a need for a system and method for video and graphic compression that can achieve a guaranteed compression ratio on small amounts of image data and overcome the shortcomings of a traditional video and graphic compression system.

A line-based one-dimensional system and method for video and graphic compression compresses an image data block that contains image data values from one or more neighboring pixels. For example, an image data block is a video line or a segment of a video line and an image data value is the value of one of the Y/U/V components of an image pixel in YUV format or the value of one of the R/G/B components of an image pixel in RGB format. The system and method involves compressing an image data sample of the image data block using multiple different compression techniques to generate multiple compression results, selecting one of the compression results, and compressing a next image data sample using the multiple different compression techniques and a compression error from the selected one of the compression results.

In an embodiment, a method for video and graphic compression involves compressing an image data sample using multiple different compression techniques to generate multiple compression results, selecting one of the compression results, and compressing a next image data sample using the multiple different compression techniques and a compression error from the selected one of the compression results.

In an embodiment, a method for video and graphic decompression involves selecting an image reconstructing technique from multiple different image reconstructing techniques based on a codeword and reconstructing an image data sample from the codeword using the selected image reconstructing technique.

In an embodiment, a system for video and graphic compression includes a compression unit, a compression error feedback unit, and an image processing unit. The compression unit is configured to compress an image data sample using multiple different compression techniques to generate multiple compression results and to select one of the compression results. The compression error feedback unit is configured to generate compression error feedback based on a compression error from the selected one of the compression results. The image processing unit is configured to combine a next image data sample with the compression error feedback to generate a combined result. The compression unit is further configured to compress the combined result using the multiple different compression techniques.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

Figure 1:
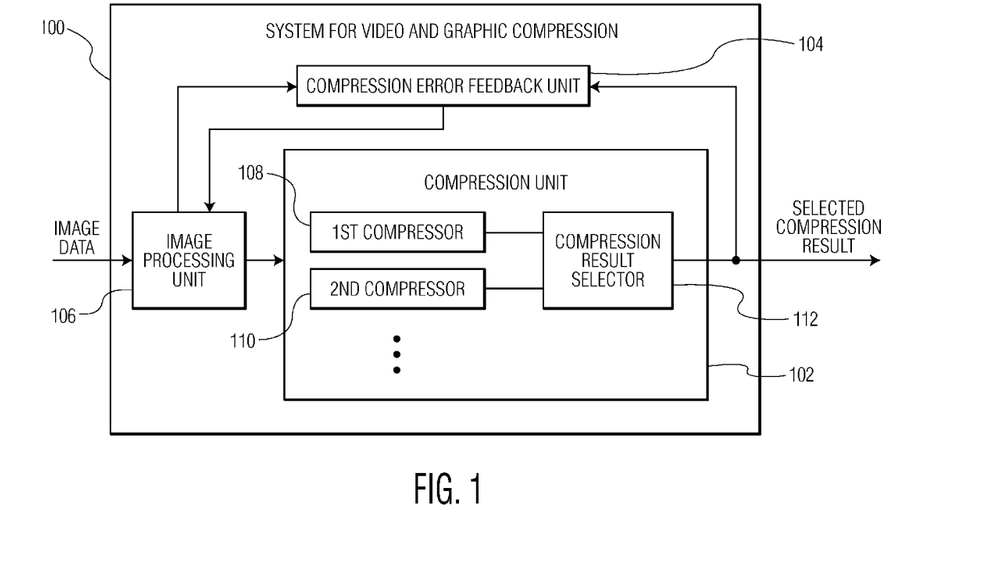
FIG. 1 is a schematic block diagram of a system for video and graphic compression in accordance with an embodiment of the invention.

FIG. 1 is a schematic block diagram of a system 100 for video and graphic compression in accordance with an embodiment of the invention. As shown in FIG. 1, the system for video and graphic compression includes a compression unit 102, a compression error feedback unit 104, and an image processing unit 106. The system for video and graphic compression can be used to compress video with sequences of video images that are captured by a video camera and to compress graphics, for example, to compress computer graphics that are generated by a computer. The system for video and graphic compression can be used in a video and graphic system on chip (SoC) and can be implemented in, for example, home, automobile, mobile, and medical applications.

The system 100 for video and graphic compression processes at least one image data value, which is from a video source (not shown) and/or a graphic source (not shown) to generate a compression result. For example, the system for video and graphic compression compresses an image data block that contains image data values from one or more neighboring pixels by individually compressing each image data value in the image data block. For example, an image data block is a video line or a segment of a video line and an image data value is the value of one of the Y/U/V components of an image pixel in YUV format or the value of one of the R/G/B components of an image pixel in RGB format. The compression result may include at least one code, at least one number, at least one symbol, and/or at least one bit. For example, the compression result is a codeword or at least one bit that represents the codeword. Because the compression result is smaller than the image data value in size, the compression result occupies less computer medium storage space than the image data value occupies and/or consumes less memory bandwidth than the image data value consumes. In an embodiment, the system for video and graphic compression compresses an image data block containing one or more image data values, which are from neighboring pixels and from one or more planes, by individually compressing each image data value in the image data block. In an example, the image data block contains only the Y component values of a group of neighboring pixels. In an alternative example, the image data block contains values of multiplexed U/V components or values of multiplexed R/G/B components from the group of neighboring pixels.

The compression unit 102 is configured to compress at least one image data sample using multiple different compression techniques to generate a compression result. The image data sample may be an image data value, a result of combining at least one current image data value and a function of a compression error of at least one previous image data value, or a result of combining at least one current image data value and a function of a compression error of at least one previous image data sample. The compression techniques may include any image compression technique that can operate on at least one image data sample and produce a compression result, which is smaller in size than the image data sample. For example, the compression techniques include image quantization techniques such as differential quantization and non-differential quantization.

In the embodiment of FIG. 1, the compression unit 102 includes at least two compressors, a first compressor 108 and a second compressor 110, and a compression result selector 112. Each compressor compresses the image data sample using a different compression technique to generate a compression result. The compression result selector selects a compression result from the generated compression results. In an embodiment, the generated compression results have the same fixed size. The selected compression result may be a compression result that results in the lowest compression error among the generated compression results. Although the compression unit of the embodiment of FIG. 1 includes multiple compressors, the compression unit may include a single compressor that employs multiple different compression techniques, where the single compressor compresses the image data sample using one of the multiple different compression techniques in a sequence of time. For example, the single compressor compresses the image data sample using a first compression technique during a first time period and then compresses the image data sample using a second compression technique during a second time period.

In an embodiment, the compression result selector 112 generates a reconstructed image data sample from each of the compression results, compares each reconstructed image data sample with the image data sample, and selects a compression result whose reconstructed image data sample is closest to the image data sample among the reconstructed image data samples. In other words, the difference between the image data sample and the reconstructed image data sample from the selected compression result is lowest among the differences between the image data sample and the reconstructed image data samples from the compression results.

In an embodiment, the compression unit 102 compresses at least one image data sample using the multiple different techniques in a single pass. In other words, the compression on the image data sample using the multiple different compression techniques is performed only once. Because the compression on the image data sample using the multiple different compression techniques is performed only once, embodiments of the system 100 for video and graphic compression described with reference to FIG. 1 are simpler to implement than a multi-pass video and graphic compression system.

Because the compression unit 102 compresses at least one image data sample using the multiple different compression techniques to produce multiple compression results and because the compression unit selects a best compression result, i.e., one that results in the lowest compression error among the compression results, is selected as the output compression result, the maximum compression error of the compression unit is limited. That is, the compression error of the compression unit will not exceed the lowest compression error among the compression errors of the compression results. Because the maximum compression error of the compression unit is limited, a good image quality can be achieved.

The compression error feedback unit 104 is configured to generate compression error feedback based on the compression error of the selected compression result. The compression error feedback unit then provides the compression error feedback to the compression unit 102. In an embodiment, the absolute value of the compression error feedback is smaller than or equal to the absolute value of the compression error of the selected compression result to prevent artifacts. For example, the compression error feedback is a fraction of the compression error of the selected compression result, where the fraction is between 0% and 100%. In an embodiment, the fraction of the compression error that is propagated to the next image data sample is determined dynamically depending on the current image data sample alone or depending on the current image data sample and one or more previous image data samples. For example, the fraction of the compression error is determined using models that exploit properties of the human visual system such as a reduced sensitivity for errors at edges and an increased sensitivity for errors in relatively flat areas.

In an embodiment, the compression error feedback unit 104 generates a reconstructed image data sample from the selected compression result and calculates a difference between the reconstructed image data sample and the image data sample to generate the compression error, wherein the compression error is equal to the difference between the reconstructed image data sample and the image data sample. Alternatively, the compression error of the selected compression result may be calculated by the compression unit 102, for example, by the compression result selector 112.

The image processing unit 106 is configured to combine a current image data value with the compression error feedback of a previous image data sample to generate a combined result: the current image data sample. In an embodiment, the current image data sample is equal to a sum of the compression error feedback and the previous image data sample.

Because of the feedback loop of the compression unit 102 and the compression error feedback unit 104, the compression error from a previous image data sample is at least partially added to a current image data value. Therefore, the feedback loop reduces compression errors and makes sure that the average compression error is close to zero.

An exemplary operation of the system 100 of FIG. 1 is now described with respect to an image data block containing a sequence of image data values. A first image data value of the sequence of image data values is compressed by the compression unit 102 without any compression error feedback from the compression error feedback unit 104. Each successive image data value is combined with the compression error, which results from compressing the last image data sample or the last image data value, to generate a combined result. The combined result is then compressed by the compression unit.

Figure 2:
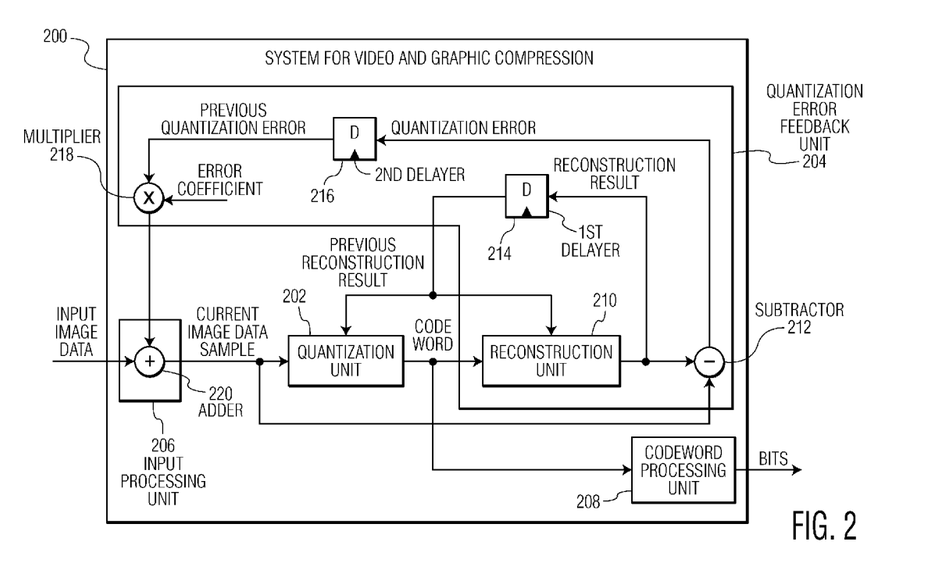
FIG. 2 depicts an exemplary embodiment of the system for video and graphic compression described with reference to FIG. 1.

An exemplary embodiment of the system 100 for video and graphic compression described above with reference to FIG. 1 is described below with reference to FIG. 2. As shown in FIG. 2, the system for video and graphic compression 200 includes a quantization unit 202, a quantization error feedback unit 204, an input processing unit 206, and a codeword processing unit 208. The system of FIG. 2 processes an image data block containing one or more image data values, derives an image data sample from each individual image data value and the quantization error feedback, and performs quantization on each image data sample to generate a codeword, which is smaller than the individual image data value in size. Because the codeword is smaller than the image data value, the codeword occupies less computer medium storage space than the image data value occupies and/or consumes less memory bandwidth than the image data value consumes.

In the embodiment of FIG. 2, the quantization unit 202 is configured to perform quantization on at least one image data sample using multiple different quantization techniques, respectively, to generate a codeword. The image data sample may be an image data value, a result of combining at least one current image data value and a function of a quantization error of at least one previous image data value, or a result of combining at least one current image data value and a function of a quantization error of at least one previous image data sample. For example, the quantization unit select a best value of multiple different values, i.e., the value what is closest to the value of the image data sample or a predefined function of the value of the image data sample, and generates the codeword based on the selected value. In other words, the difference between the image data sample and the best value that is selected by the quantization unit is lowest among the differences between the image data sample and the multiple different values. In an embodiment, every generated codeword has a unique value. In other words, for each codeword, there is no other codeword that is identical to the codeword. In an embodiment, the quantization unit compresses a result of combining at least one current image data value and a function of the quantization error of at least one previous image data sample.

In an embodiment, the quantization unit 202 performs quantization on at least one image data sample using the multiple different quantization techniques in a single pass. That is, the quantization on an image data sample using the multiple different quantization techniques is performed only once by the quantization unit. An exemplary embodiment of the quantization unit is described below with reference to FIG. 3.

Figure 3:
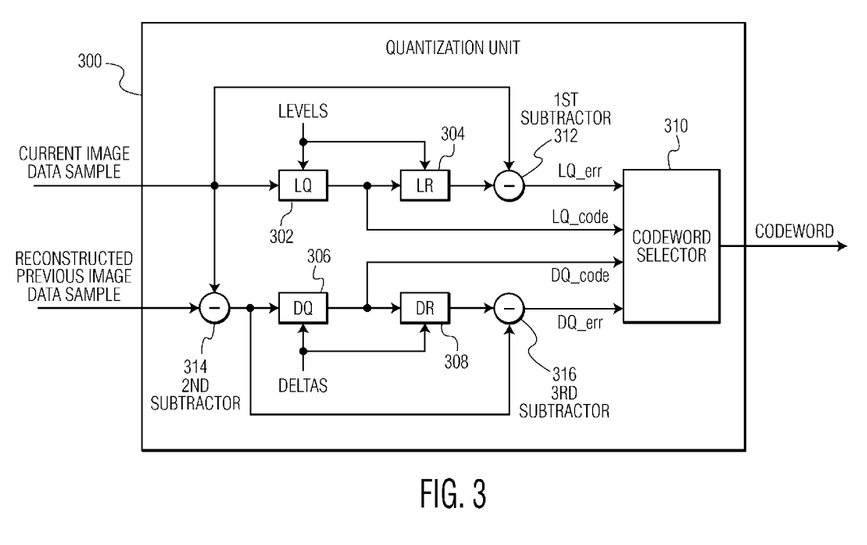
FIG. 3 depicts an exemplary quantization unit of the system for video and graphic compression described with reference to FIG. 2.

In the embodiment of FIG. 3, the quantization unit 300 includes a level quantizer "LQ" 302, a level reconstructor "LR" 304, a differential quantizer "DQ" 306, a differential reconstructor "DR" 308, a codeword selector 310, a first subtractor 312, a second subtractor 314, and a third subtractor 316.

The LQ 302 is configured to compare at least one current image data sample with quantization values, to choose a quantization value that is closest to the current image data sample among the quantization values, to generate at least one codeword from the quantization value, and to output the generated codeword to the codeword selector 310. In other words, the difference between the image data sample and the chosen quantization value is lowest among the differences between the image data sample and the quantization values. The quantization values are also referred to as quantization "levels" and the codeword generated by the LQ is also referred to as a level quantization codeword "LQ_code." In an embodiment, each quantization value is associated with a unique codeword and the LQ selects and provides the codeword, which is associated with the quantization value that is closest to the current image data sample among the quantization values, to the codeword selector.

The LR 304 is configured to reconstruct at least one image data sample from at least one codeword and to output the reconstructed image data sample to the first subtractor 312. In an embodiment, the LR derives a unique quantization value from the codeword and outputs the derived quantization value to the first subtractor.

The first subtractor 312 is configured to perform a subtraction between at least one image data sample and the reconstructed at least one image data sample from the LR 304 to calculate a difference between the image data sample and the reconstructed image data sample, and to output the calculated difference between the image data sample and the reconstructed image data sample to the codeword selector 310. The difference between the image data sample and the reconstructed image data sample is also referred to as a level quantizer quantization error "LQ_err."

The second subtractor 314 is configured to perform a subtraction between at least one current image data sample and at least one reconstructed previous image data sample to calculate a difference between the current image data sample and the reconstructed previous image data sample and to output the calculated difference between the current image data sample and the reconstructed previous image data sample to the DQ 306 and the third subtractor 316.

The DQ 306 is configured to compare the difference between at least one image data sample and at least one reconstructed previous image data sample, which is input from the second subtractor 314, with differential values. In an embodiment, the DQ uses multiple reconstructed previous image data samples for differential quantization of a current image data sample. For example, the DQ uses the last two reconstructed previous image data samples for differential quantization of the current image data sample when the value of the before-last reconstructed image data sample is closer to the value of the current image data sample than the value of the last reconstructed image data sample, especially in alternating patterns such as checkerboard patterns that occur in graphics. Additionally, the DQ may choose one or more reconstructed previous image data samples from the multiple reconstructed previous image data samples for differential quantization of the current image data sample. In an example, the DQ adds a unique code to a generated codeword for each additional reconstructed previous image data sample beside the last reconstructed image data sample. In another example, the DQ chooses the one or more reconstructed previous image data samples from the multiple reconstructed previous image data samples based on statistics such as pattern recognition of the multiple reconstructed previous image data samples. The DQ is also configured to choose a differential value that is closest to the difference between the image data sample and the reconstructed previous image data sample among the differential values, to generate a codeword from the differential value, and to output the generated codeword to the codeword selector 310 and the DR 308. In other words, the difference between the chosen differential value and the difference between the image data sample and the reconstructed previous image data sample is lowest among the differences between the differential values and the difference between the image data sample and the reconstructed previous image data sample. The differential values are also referred to as "delta" values and the codeword generated by the DQ is also referred to as a differential quantization codeword "DQ_code." In an embodiment, each differential value is associated with a unique codeword and the DQ selects and outputs the codeword, which is associated with the differential value that is closest to the difference between the image data sample and the reconstructed previous image data sample among the differential values, to the codeword selector and the DR.

In an embodiment, the number of relatively small differential values is larger than the number of relatively large differential values. For example, a set of N differential values can be predefined so that a differential value [i] is equal to $(i^p)/((N-1)^p) \cdot MD$, where N is a positive integer, i in the range $0 \ldots N-1$, MD is the value of the largest delta, and p is a parameter that denotes the power of the function and is typically between 1.5 and 2.5 to give good visual results. Human visual perception of an error on a differential value when the differential value is relatively large is less than human visual perception of the same error on a differential value when the differential value is relatively small. Therefore, having a larger number of relatively small differential values and a small number of relatively large differential values improves human visual perception of processed video and graphic data.

The DR 308 is configured to derive a differential value between at least one current image data sample and at least one reconstructed previous image data sample from at least one codeword.

The third subtractor 316 is configured to perform a subtraction between the derived differential value from the DR 308 and the calculated actual difference between the current image data sample and the reconstructed previous image data sample from the second subtractor 314 to calculate a difference between the derived differential value and the actual difference between the image data sample and the reconstructed previous image data sample, and to output the calculated difference to the codeword selector 310. The difference between the differential value and the calculated actual difference between the image data sample and the reconstructed previous image data sample is also referred to as a differential quantizer quantization error "DQ_err." In an embodiment, the differential values are predefined in the DQ in a way that the differential quantizer quantization error DQ_err is always smaller than the actual difference between the image data sample and the reconstructed previous image data sample.

The codeword selector 310 is configured to compare the level quantizer quantization error LQ_err that is generated by the first subtractor 312 with the differential quantizer quantization error DQ_err that is generated by the third subtractor 316. The codeword selector is further configured to select one of the level quantization codeword LQ_code and the differential quantizer quantization error DQ_err as an output codeword. Specifically, the codeword selector selects the level quantization codeword LQ_code as the output codeword when the level quantizer quantization error LQ_err is smaller than the differential quantizer quantization error DQ_err and selects the level quantization codeword DQ_code as the output codeword when the level quantizer quantization error LQ_err is larger than the differential quantizer quantization error DQ_err.

The number of unique codewords that are generated by the DQ 306 and the LQ 302 determines the compression ratio. For example, if an input image data sample has R possible values and is compressed using K unique codewords, then compression ratio is equal to $\log 2(R)/\log 2(K)$, wherein K and R are both positive integers. In an embodiment, a codeword that is generated by the DQ or the LQ has a fixed size. In other words, the DQ and the LQ compress image data samples of any size into codewords that have the same fixed size.

In an embodiment, every codeword that is generated by the DQ 306 or by the LQ 302 is unique and an intersection of all of the possible values of a codeword that is generated by the LQ and all of the possible values of a codeword that is generated by the DQ is empty. For example, N differential values are mapped to codewords $0 \ldots N-1$ by the DQ and M quantization value levels are mapped to codewords $N \ldots N+M-1$ by the LQ, wherein N and M are both positive integers. Therefore, N differential values and M quantization value levels are mapped to N+M unique codewords.

Although the first subtractor 312, the second subtractor 314, and the third subtractor 316 are shown in FIG. 3 as being separate from other components of the quantization unit 300, one or all of the three subtractors may be integrated into other components of the quantization unit in other embodiments.

An exemplary operation of the quantization unit 300 of FIG. 3 is described as follows. The quantization unit processes a current image data sample and a reconstructed previous image data sample, which is also referred to as a reference image data sample, to generate a codeword. Specifically, the LQ 302 compares the current image data sample with quantization value levels, chooses a quantization value level that is closest to the current image data sample among the quantization value levels, generates a codeword LQ_code from the quantization value level, and outputs the generated codeword LQ_code to the codeword selector 310. The LR 304 derives a quantization value from the codeword LQ_code and outputs the derived quantization value to the first subtractor 312 and the first subtractor calculates a difference LQ_err between the current image data sample and the derived quantization value, and outputs the calculated difference LQ_err to the codeword selector. The second subtractor 314 calculates a difference between the current image data sample and the reconstructed previous image data sample and outputs the calculated difference between the current image data sample and the reconstructed previous image data sample to the DQ 306 and the third subtractor 316. The DQ compares the difference between the current image data sample and the reconstructed previous image data sample with differential values, chooses a differential value that is closest to the difference between the image data sample and the reconstructed previous image data sample among the differential values, generates a codeword DQ_code from the differential value, and outputs the generated codeword DQ_code to the codeword selector. The DR 308 derives a differential value from the codeword DQ_code and the third subtractor calculates and outputs a difference DQ_err between the derived differential value from the DR and the difference between the current image data sample and the reconstructed previous image data sample from the second subtractor to the codeword selector. The codeword selector compares the level quantizer quantization error LQ_err with the differential quantizer quantization error DQ_err, selects one of the level quantization codeword LQ_code and the differential quantizer quantization error DQ_err that has a lower quantization error as an output codeword, and outputs the output codeword to the reconstruction unit.

Referring back to the embodiment of FIG. 2, the quantization error feedback unit 204 includes a reconstruction unit 210, a subtractor 212, a first delayer 214, a second delayer 216, and a multiplier 218. The quantization error feedback unit is configured to calculate a quantization error from the quantization result of at least one image data sample and generate quantization error feedback based on the quantization error. In an embodiment, the absolute value of the quantization error feedback is smaller than or equal to the absolute value of the quantization error.

Figure 4:
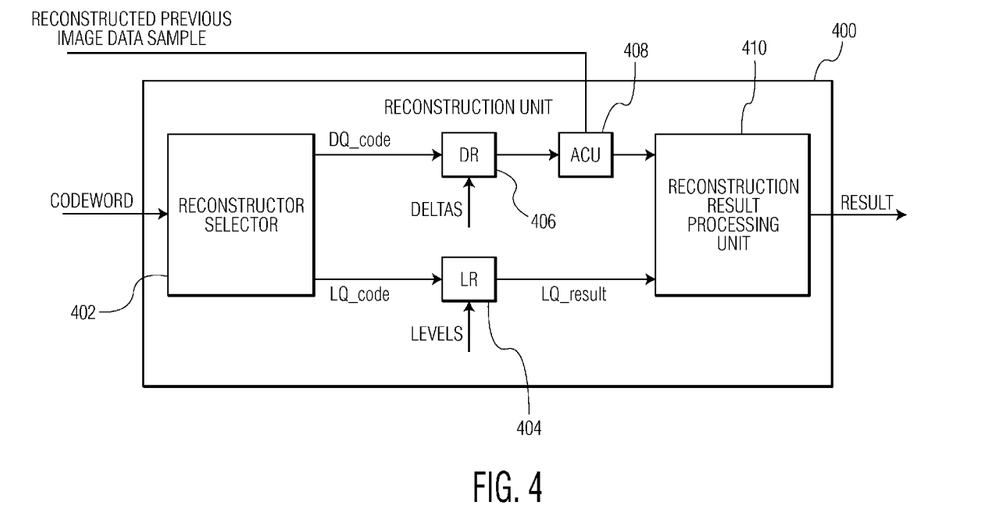
FIG. 4 depicts an exemplary reconstruction unit of the system for video and graphic compression described with reference to FIG. 2.

The reconstruction unit 210 is configured to reconstruct at least one image data sample from a codeword. An exemplary embodiment of the reconstruction unit is described below with reference to FIG. 4. In the embodiment of FIG. 4, the reconstruction unit 400 includes a reconstructor selector 402, a level reconstructor "LR" 404, a differential reconstructor "DR" 406, an arithmetic computation unit (ACU) 408, and a reconstruction result processing unit 410.

The reconstructor selector 402 is configured to select an image reconstructing technique based on a received codeword from a predefined set of multiple different reconstructing techniques. Specifically, the reconstructor selector selects one of the LR 404 or the DR 406 based on the codeword.

The LR 404 may be similar to the level reconstructor "LR" 304 described with reference to FIG. 3. In the embodiment of FIG. 4, the LR is configured to derive a quantization value from the codeword and outputs the derived quantization value to the reconstruction result processing unit.

The DR 406 may be similar to the differential reconstructor "DR" 308 described with reference to FIG. 3. In the embodiment of FIG. 4, the DR is configured to derive a differential value between a current image data sample and a reconstructed previous image data sample from the codeword and to output the derived differential value to the arithmetic computation unit 408.

The arithmetic computation unit 408 is configured to combine the reconstructed previous image data sample and the derived differential value from the DR 406 to generate an image data sample. The reconstruction result processing unit 410 outputs the result from the LR 404 or the arithmetic computation unit.

An exemplary operation of the reconstruction unit of FIG. 4 is described as follows. Based on the codeword, the reconstructor selector 402 selects one of the LR 404 and the DR 406 to reconstruct an image data sample from the codeword and the reconstruction result processing unit 410 outputs the result that is from the LR or the result that is derived from the DR.

Referring back to the embodiment of FIG. 2, the first delayer 214 is configured to delay the reconstruction result from the reconstruction unit 210 a period of time and to output the delayed reconstruction result to the quantization unit 202 and the reconstruction unit. The subtractor 212 is configured to calculate a difference between at least one image data sample and at least one reconstructed image data sample from the reconstruction unit 210 to generate a quantization error of the image data sample and to output the quantization error to the second delayer 216. The second delayer is configured to delay the quantization error a period of time and to output the delayed quantization error to the multiplier 218. The multiplier is optional and configured to multiply the delayed quantization error with an error coefficient to generate the quantization error feedback. In an embodiment, the absolute value of the error coefficient is smaller than or equal to one.

The input processing unit 206 includes an adder 220 that is configured to add at least one image data sample with the quantization error feedback and to output the addition result to the quantization unit 202 and the subtractor 212.

The codeword processing unit 208 is configured to convert the codeword from the quantization unit into at least one bit and to output the at least one bit. The codeword processing unit may not convert the codewords to an integer number of bits. In other words, the number of unique codewords may not equal to a power of two. In general, if each codeword has K possible values, then G codewords can be grouped together into B bits if $K^G \leq 2^B$, where K, G, and B are positive integers. For example, if the total number of codewords K is 40, then 3 of such codewords can be converted into 16 bits. As a result, the codeword processing unit achieves an average of 5.33 bits per codeword.

The system 200 of FIG. 2 combines smart quantization with error diffusion dithering. As a result, the system of FIG. 2 achieves a good compression ratio without affecting video or graphic image quality. Although the quantization unit 202 and the reconstruction unit 210 are shown in FIG. 2 as being separate from each other, the quantization unit and the reconstruction unit may be integrated together in other embodiments.

Compared to a traditional video and graphic compression system, embodiments of systems 100, 200 for video and graphic compression described with reference to FIGS. 1-4 do not put any constraint on segmentation of input video and graphic data and do not result in segmentation artifacts. Additionally, embodiments of a system for video and graphic compression described with reference to FIGS. 1-4 are simple to implement and can achieve a compression ratio of 2.0 or higher for video and graphic data while preserving high picture quality.

Figure 5:
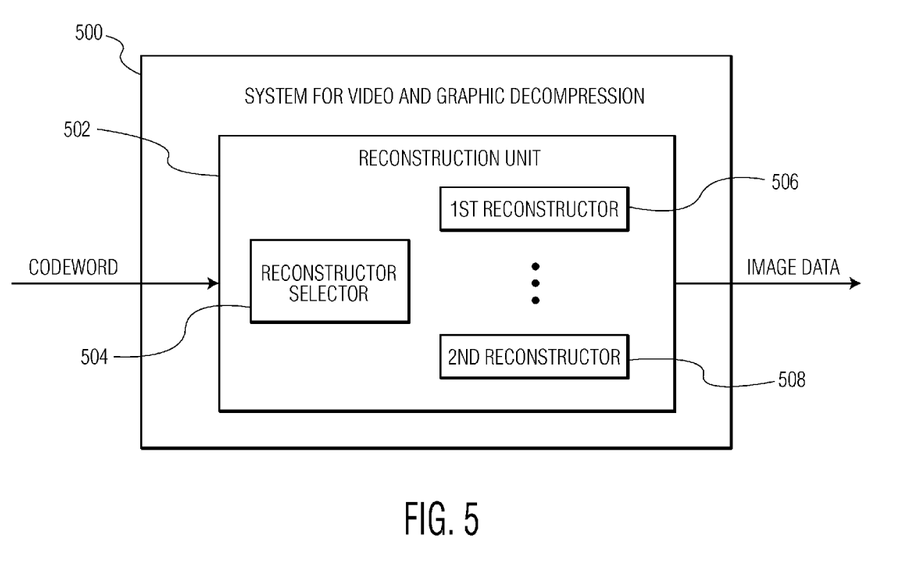
FIG. 5 is a schematic block diagram of a system for video and graphic decompression in accordance with an embodiment of the invention.

FIG. 5 is a schematic block diagram of a system 500 for video and graphic decompression in accordance with an embodiment of the invention. As shown in FIG. 5, the system for video and graphic decompression includes a reconstruction unit 502 that is configured to reconstruct at least one image data sample or value from a codeword.

In the embodiment of FIG. 5, the reconstruction unit 502 includes a reconstructor selector and at least two reconstructors, $1^{st}$ reconstructor 506 and $2^{nd}$ reconstructor 508. Based on the codeword, the reconstructor selector selects one of the reconstructors to reconstruct at least one image data sample or value from the codeword. Each reconstructor is configured to reconstruct at least one image data sample or value based on the codeword using a different image reconstruction technique. Although the reconstruction unit described with reference to FIG. 5 includes multiple reconstructors, the reconstruction unit may include a single reconstructor that employs multiple different image reconstruction techniques. For example, the single reconstructor reconstructs at least one image data sample or value from a codeword using one of the image reconstruction techniques, which is selected based on the codeword by the single reconstructor.

Figure 6:
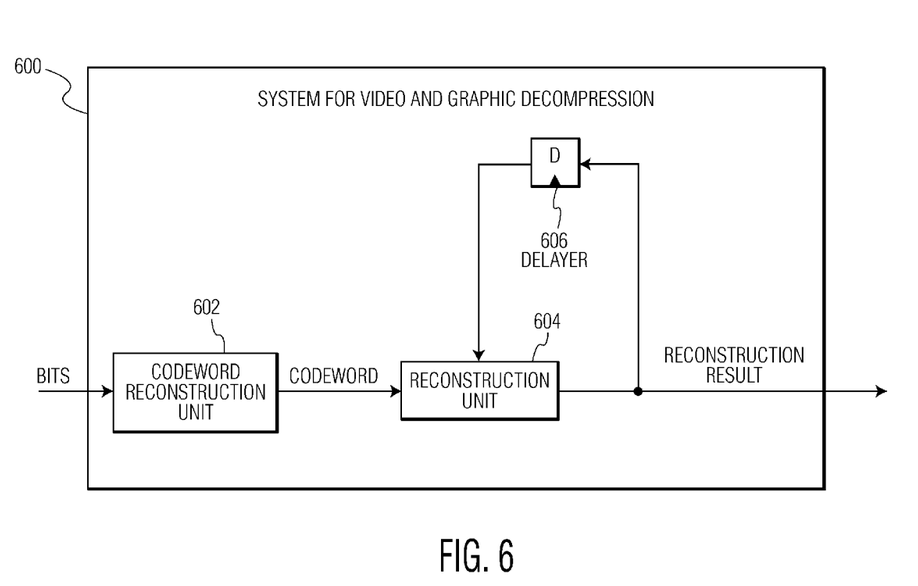
FIG. 6 depicts an exemplary embodiment of the system for video and graphic decompression described with reference to FIG. 5.

An exemplary embodiment of the system 500 for video and graphic decompression is described below with reference to FIG. 6. As shown in FIG. 6, the system for video and graphic decompression 600 includes a codeword reconstruction unit 602, a reconstruction unit 604, and a delayer 606.

The codeword reconstruction unit is configured to reconstruct a codeword from at least one bit and to output the reconstructed codeword to the reconstruction unit 604. The reconstruction unit is configured to reconstruct at least one image data sample or value from the reconstructed codeword that is input from the codeword reconstruction unit. The reconstruction unit in the embodiment of FIG. 6 may be similar to the reconstruction unit 400 described with reference to FIG. 4. The delayer 606 is configured to delay a reconstructed image data sample or value from the reconstruction unit a period of time and to output the delayed reconstructed image data sample or value to the reconstruction unit.

Figure 7:
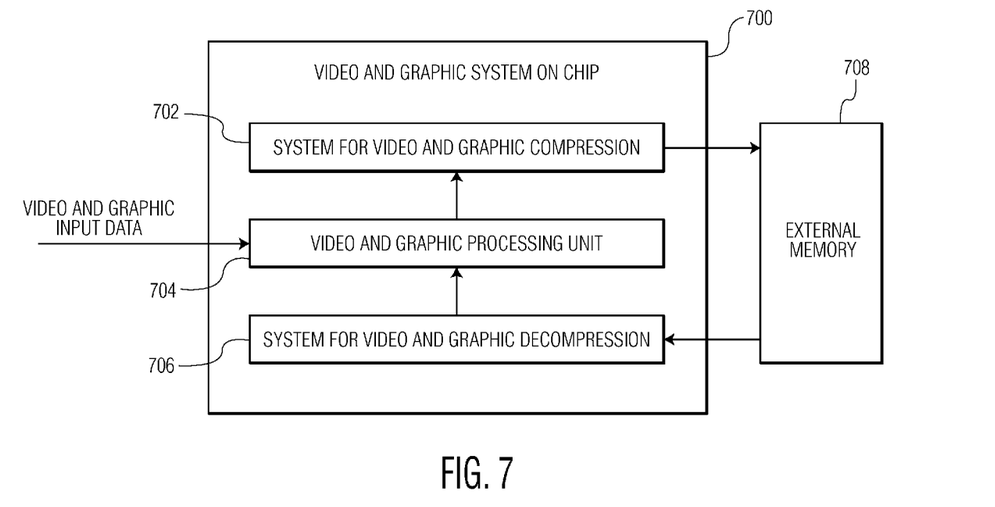
FIG. 7 is a schematic block diagram of a video and graphic SoC in accordance with an embodiment of the invention.

FIG. 7 is a schematic block diagram of a video and graphic SoC in accordance with an embodiment of the invention. As shown in FIG. 7, the video and graphic SoC includes a system 702 for video and graphic compression, a video and graphic processing unit 704, and a system 706 for video and graphic decompression. In the video and graphic SoC, some video and graphic data is stored in external memory 708, such as external synchronous dynamic random access memory (SDRAM). The video and graphic SoC may communicate with the external memory through an SoC memory interface (not shown).

In the embodiment of FIG. 7, the video and graphic processing unit 704 is configured to process video and graphic input data to generate a processing result and to output the processing result to the system for video and graphic compression 702. The system for video and graphic compression is configured to compress the processing result that is from the video and graphic processing unit to generate a compression result and to output the compression result to the external memory 708 for storage. The system for video and graphic decompression 706 is configured to decompress the compression result that is input from the external memory to reconstruct an original processing result and to output the reconstruction result to the video and graphic processing unit for processing. The system for video and graphic compression in the embodiment of FIG. 7 may be similar to the system 200 for video and graphic compression described with reference to FIG. 2. The system for video and graphic decompression in the embodiment of FIG. 7 may be similar to the system 500 for video and graphic decompression described with reference to FIG. 5.

The compression process between the video and graphic processing unit 704 and the external memory 708 that is performed by the system for video and graphic compression 702 is also referred to as embedded video and graphic compression. Embedded video and graphic compression can save memory footprint of the video and graphic SoC 700 and reduce the bandwidth requirement between the video and graphic SoC and the external memory. Different from industry compression standards such as Moving Picture Experts Group (MPEG) standards such as MPEG2, H.264/AVC and Joint Photographic Experts Group (JPEG) standards such as JPEG and JPEG2000, embedded video and graphic compression can compress video and graphic data in small blocks, which can be as small as a single image data value, with a constant data rate. Additionally, embedded video and graphic compression can support random data access within a video frame and therefore can be transparent to the video and graphic processing.

Figure 8:
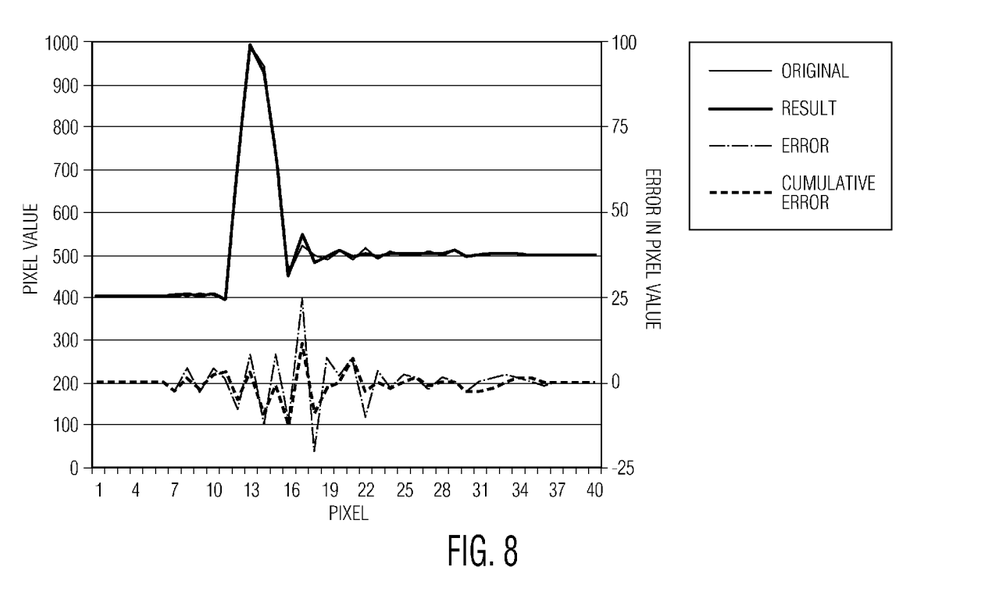
FIGS. 8 and 9 depict results of compression and decompression of a 10-bit video data using a system for video and graphic compression and decompression in accordance with an embodiment of the invention.
Figure 9:
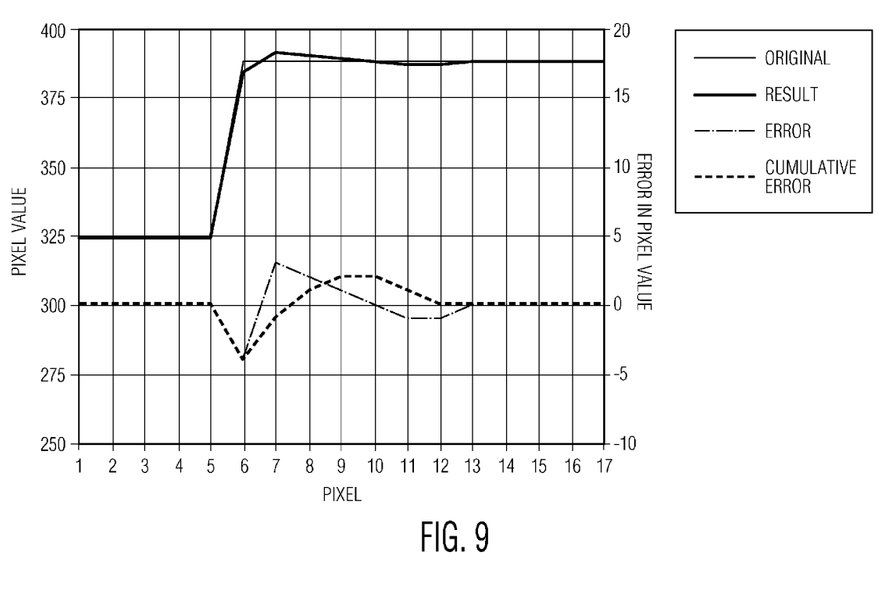

FIGS. 8 and 9 depict results of compression and decompression of a 10-bit video data with a compression ratio of 2.0 using a system for video and graphic compression and decompression in accordance with an embodiment of the invention. The system for video and graphic compression and decompression may include the system for video and graphic compression and the system for video and graphic decompression described with reference to FIGS. 2-6. Because each original video image data value includes 10 bits and the compression ratio is 2.0, the compression result of each video image data value includes 5 bits and the number of codewords is $2^5$, which is equal to 32. Out of the 32 codewords, 25 codewords are used for the LQ and 7 codewords are used for the DQ. Specifically, FIGS. 8 and 9 show input video data, reconstructed video data, quantization errors, and cumulative quantization errors of two different sections of a line of pixels in a test image. As shown in FIGS. 8 and 9, average quantization error is zero and the cumulative error converges to zero.

Figure 10:
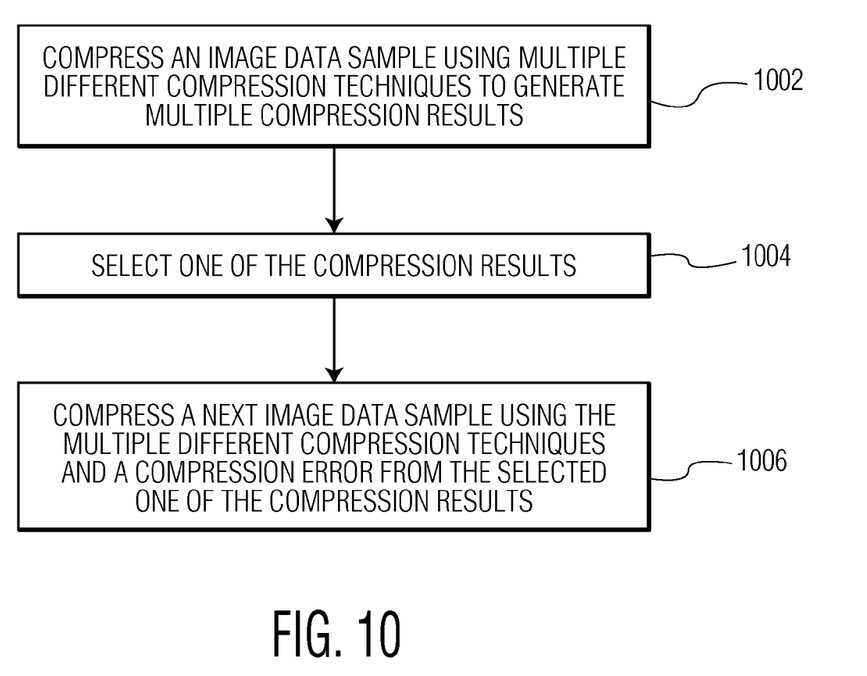
FIG. 10 is a process flow diagram of a method for video and graphic compression in accordance with an embodiment of the invention.

FIG. 10 is a process flow diagram of a method for video and graphic compression in accordance with an embodiment of the invention. At block 1002, an image data sample is compressed using multiple different compression techniques to generate multiple compression results. At block 1004, one of the compression results is selected. At block 1006, a next image data sample is compressed using the multiple different compression techniques and a compression error from the selected one of the compression results.

The various components or units of the embodiments that have been described or depicted may be implemented in software that is stored in a computer readable medium, hardware, firmware, or a combination of software that is stored in a computer readable medium, hardware, and firmware.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for video and graphic compression, the method comprising:
   compressing an image data sample using multiple different compression techniques to generate multiple compression results;
   selecting one of the compression results; and
   compressing a next image data sample using the multiple different compression techniques and a compression error from the selected one of the compression results, wherein compressing the next image data sample comprises:
   generating compression error feedback based on the compression error, wherein the absolute value of the compression error feedback is smaller than or equal to the absolute value of the compression error;
   combining the next image data sample with the compression error feedback to generate a combined result; and
   compressing the combined result using the multiple different compression techniques.

2. The method of claim 1 further comprising:
   generating a reconstructed image data sample from the selected one of the compression results; and
   calculating a difference between the reconstructed image data sample and the image data sample to generate the compression error, wherein the compression error is equal to the difference between the image data sample and the reconstructed image data sample.

3. The method of claim 1, wherein selecting one of the compression results comprises selecting a compression result that results in the lowest compression error among the compression results.

4. The method of claim 3, wherein selecting the compression result that results in the lowest compression error among the compression results comprises:
   generating a reconstructed image data sample from each of the compression results;
   comparing each reconstructed image data sample with the image data sample; and selecting a compression result whose reconstructed image data sample is closest to the image data sample among the reconstructed image data samples.

5. The method of claim 1, wherein the combined result is equal to a sum of the compression error feedback and the second image data sample.

6. The method of claim 1, wherein the multiple compression results have the same fixed size.

7. The method of claim 1, wherein compressing an image data sample using the multiple different compression techniques is a single pass.

8. The method of claim 1, wherein compressing an image data sample using the multiple different compression techniques comprises performing quantization on the image data sample using multiple different quantization techniques to generate codewords, and wherein selecting one of the compression results comprises selecting a codeword that results in the lowest quantization error among the generated codewords, wherein each of the codewords has a unique value.

9. The method of claim 8 further comprising converting at least one of the codewords into at least one bit, wherein the at least one of the codewords and the at least one bit satisfy:
$K^G \leq 2^B$,
where each of the codeword has K possible values, G represents the number of codeword of the at least one codewords, B represents the number of bit of the at least one bit, and K, G, and B are positive integers.

10. The method of claim 8, wherein performing quantization on the image data sample comprises:
comparing the image data sample with quantization values;
choosing a quantization value that is closest to the image data sample among the quantization values; and
generating a first codeword from the quantization value.

11. The method of claim 10, wherein performing quantization on the image data sample further comprises:
calculating a difference between the image data sample and a reference image data sample;
comparing the difference between the image data sample and the reference image data sample with differential values;
choosing a differential value that is closest to the difference between the image data sample and the reference image data sample among the differential values; and
generating a second codeword from the differential value.

12. The method of claim 11 further comprising reconstructing a previous image data sample, wherein the reference image data sample is the reconstructed previous image data sample.

13. The method of claim 11 further comprising:
deriving the quantization value from the first codeword and calculating a difference between the quantization value and the image data sample;
deriving the differential value from the second codeword and calculating a difference between the differential value and the difference between the image data sample and the reference image data sample;
comparing the difference between the quantization value and the image data sample and the difference between the differential value and the difference between the image data sample and the reference image data sample;
selecting the first codeword as an output codeword when the difference between the quantization value and the image data sample is smaller than the difference between the differential value and the difference between the image data sample and the reference image data sample and selecting the second codeword as the output codeword when the difference between the quantization value and the image data sample is larger than the difference between the differential value and the difference between the image data sample and the reference image data sample; and
outputting the output codeword.

14. A system for video and graphic compression, the system comprising:
a compression unit configured to compress an image data sample using multiple different compression techniques to generate multiple compression results and to select one of the compression results;
a compression error feedback unit configured to generate compression error feedback based on a compression error from the selected one of the compression results; and
an image processing unit configured to combine a next image data sample with the compression error feedback to generate a combined result,
wherein the compression unit is further configured to compress the combined result using the multiple different compression techniques.

15. The system of claim 14, wherein the compression unit comprises:
a level quantizer configured to compare an image data sample with quantization values, to choose a quantization value that is closest to the image data sample among the quantization values, and to generate a first codeword from the quantization value; and
a differential quantizer configured to compare a difference between the image data sample and a reference image data sample with differential values, to choose a differential value that is closest to the difference between the image data sample and the reference image data sample among the differential values, and to generate a second codeword from the differential value.

16. The system of claim 15, wherein the compression unit further comprises a codeword selector configured to select as an output codeword the codeword that results in a smaller compression error among the first and second codewords.

17. A method for video and graphic compression, the method comprising:
compressing an image data sample using multiple different compression techniques to generate multiple compression results;
selecting one of the compression results; and
compressing a next image data sample using the multiple different compression techniques and a compression error from the selected one of the compression results,
wherein compressing an image data sample using the multiple different compression techniques comprises performing quantization on the image data sample using multiple different quantization techniques to generate codewords, and wherein selecting one of the compression results comprises selecting a codeword that results in the lowest quantization error among the generated codewords, wherein each of the codewords has a unique value, the method further comprising converting at least one of the codewords into at least one bit, wherein the at least one of the codewords and the at least one bit satisfy:
$K^G \leq 2^B$,
where each of the codeword has K possible values, G represents the number of codeword of the at least one codewords, B represents the number of bit of the at least one bit, and K, G, and B are positive integers.

18. A method for video and graphic compression, the method comprising:

compressing an image data sample using multiple different compression techniques to generate multiple compression results;

selecting one of the compression results; and compressing a next image data sample using the multiple different compression techniques and a compression error from the selected one of the compression results, wherein compressing an image data sample using the multiple different compression techniques comprises performing quantization on the image data sample using multiple different quantization techniques to generate codewords, and wherein selecting one of the compression results comprises selecting a codeword that results in the lowest quantization error among the generated codewords, wherein each of the codewords has a unique value, wherein performing quantization on the image data sample comprises:

comparing the image data sample with quantization values;

choosing a quantization value that is closest to the image data sample among the quantization values; and generating a first codeword from the quantization value.

19. The method of claim 18, wherein performing quantization on the image data sample further comprises:

calculating a difference between the image data sample and a reference image data sample;

comparing the difference between the image data sample and the reference image data sample with differential values;

choosing a differential value that is closest to the difference between the image data sample and the reference image data sample among the differential values; and generating a second codeword from the differential value.

20. The method of claim 19 further comprising reconstructing a previous image data sample, wherein the reference image data sample is the reconstructed previous image data sample.

* * * * *